United States Patent
Yoshida et al.

[19]

[11] Patent Number: 5,892,815

[45] Date of Patent: *Apr. 6, 1999

[54] IMAGE COMMUNICATION APPARATUS CAPABLE OF SWITCHING LINE TO EXTERNAL INFORMATION PROCESSING TERMINAL

[75] Inventors: Takehiro Yoshida; Masatomo Takahashi; Kenji Hashimoto, all of Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 579,398

[22] Filed: Dec. 27, 1995

[30] Foreign Application Priority Data

Dec. 28, 1994 [JP] Japan .................................. 6-338609
Oct. 12, 1995 [JP] Japan .................................. 7-290523

[51] Int. Cl.$^6$ .................................................. H04M 11/00
[52] U.S. Cl. .............................. 379/100.16; 379/100.15; 379/100.06; 358/434; 358/442
[58] Field of Search ............................... 379/100, 98, 93, 379/96, 94, 97, 102, 104, 105, 93.09, 93.11, 93.25, 100.06, 100.15, 100.16; 358/401, 434, 442, 468, 400

[56] References Cited

U.S. PATENT DOCUMENTS

| | | |
|---|---|---|
| 4,991,200 | 2/1991 | Lin .......................................... 379/100 |
| 5,020,096 | 5/1991 | Sakakibara et al. . |
| 5,022,072 | 6/1991 | Sakakibara et al. . |
| 5,065,427 | 11/1991 | Godbole .................................... 379/100 |
| 5,128,985 | 7/1992 | Yoshida et al. . |
| 5,131,026 | 7/1992 | Park ......................................... 379/100 |
| 5,151,972 | 9/1992 | Lorenz et al. ............................. 379/93 |
| 5,182,650 | 1/1993 | Inoue et al. .............................. 358/296 |
| 5,428,458 | 6/1995 | Aiba et al. ............................... 379/100 |
| 5,452,106 | 9/1995 | Perkins ..................................... 379/100 |
| 5,528,385 | 6/1996 | Manning ................................... 379/100 |
| 5,574,571 | 11/1996 | Charbonnier ............................. 379/100 |
| 5,608,546 | 3/1997 | Nakamura et al. ...................... 379/100 |
| 5,636,037 | 6/1997 | Saitoh ...................................... 379/100 |

FOREIGN PATENT DOCUMENTS

| | | |
|---|---|---|
| 0530089 | 3/1993 | European Pat. Off. . |
| 0613286 | 8/1994 | European Pat. Off. . |

OTHER PUBLICATIONS

IBM Technical Disclosure Bulletin, vol. 38, No. 10, 1 Oct. 1995.

*Primary Examiner*—Stella Woo
*Attorney, Agent, or Firm*—Fitzpatrick, Cella, Harper & Scinto

[57] ABSTRACT

An image communication apparatus comprises a connection unit for connecting an external terminal, an image communication unit for conducting image communication, a switching unit for selectively connecting a line to said connection unit and said image communication unit, a first detection unit for detecting a calling signal from said line, a second detection unit for detecting a signal relating to the image communication, a third detection unit for detecting a signal relating to data communication, and a control unit for controlling said switching unit in response to the detection by said first, second and third detection units.

28 Claims, 14 Drawing Sheets

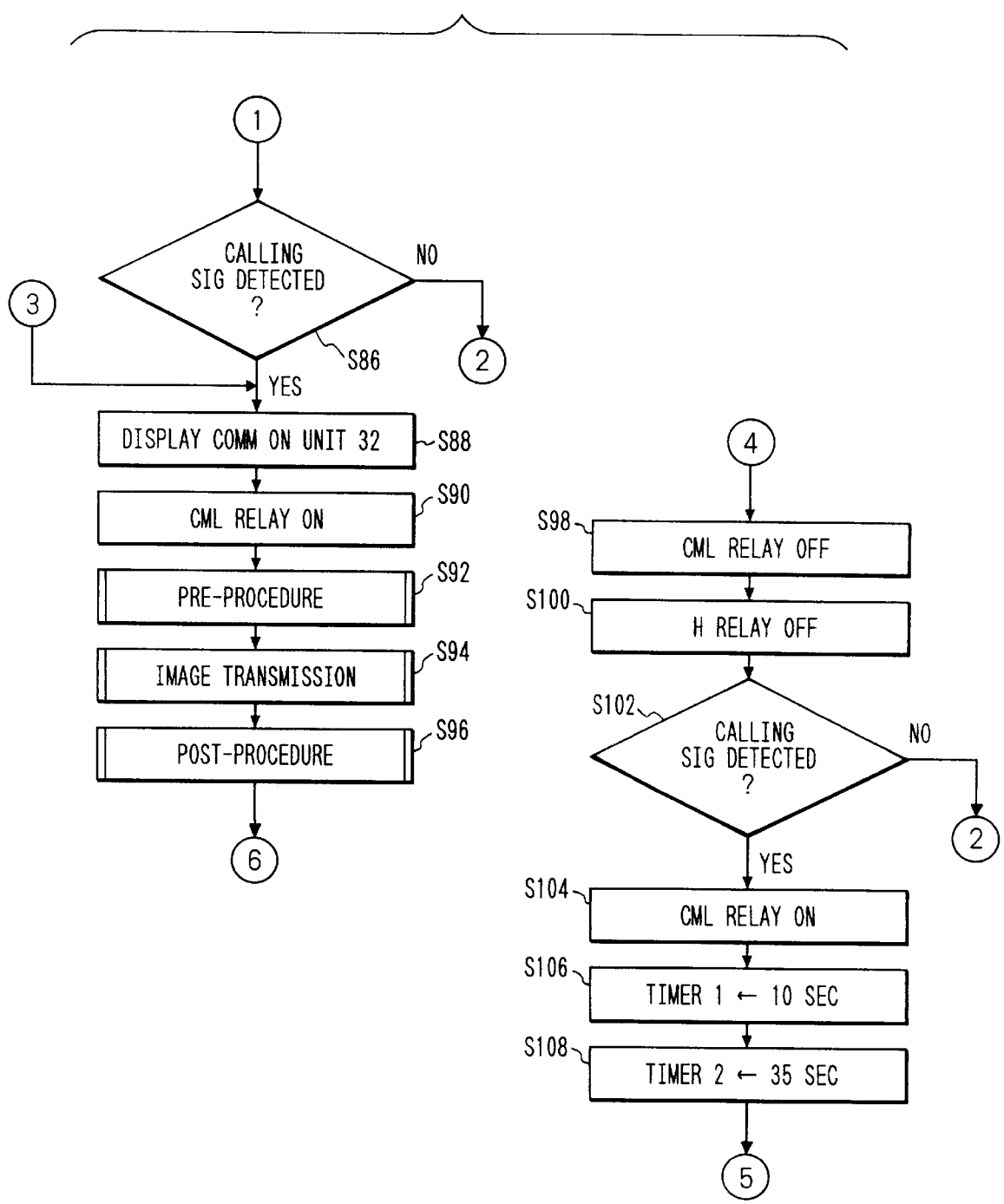

IMAGE COMMUNICATION APPARATUS CAPABLE OF SWITCHING LINE TO EXTERNAL INFORMATION PROCESSING TERMINAL

BACKGROUND OF THE INVENTION

1. Field of the Invention

The present invention relates to an image communication apparatus capable of switching a line to an external image processing terminal.

2. Related Background Art

A system which allows the use of a facsimile apparatus as a modem of an external information processing terminal (computer) and the data communication by the external information processing terminal through the facsimile apparatus has been known. In this case, it is necessary to arrange the modem for the facsimile communication to operate as the modem for the computer communication.

A personal computer in which a modem for the data communication is built in has been known. On the other hand, a conventional facsimile apparatus is provided with a terminal for connecting a conventional telephone set or an automatic answering recording telephone set and the facsimile apparatus selectively switches a line to the telephone set or the facsimile apparatus.

It has thus been contemplated to connect a computer having a modem for the data communication with a terminal for connecting a telephone set in a facsimile apparatus and set the facsimile apparatus to a manual receive mode or a speech mode to connect the line to the computer in order to attain the data communication by the computer.

However, in the prior art facsimile apparatus, only a mechanism to selectively switch one line to the speech by the external telephone set and the facsimile communication by the facsimile apparatus is provided and proper automatic switching of the data communication by the computer and the facsimile communication is not attained even if the computer is connected instead of the external telephone set.

SUMMARY OF THE INVENTION

It is an object of the present invention to provide an image communication apparatus which allows proper switching of a line to an external information processing terminal.

It is another object of the present invention to provide an image communication apparatus capable of switching the line to the external information processing apparatus, which can protect the external information processing terminal against an abnormal voltage from the line.

Other objects of the present invention will be apparent from the following detailed description of the preferred embodiments and the accompanying drawings.

BRIEF DESCRIPTION OF THE DRAWINGS

FIG. 3 shows a flow chart of an operation of the first embodiment;

DETAILED DESCRIPTION OF THE PREFERRED EMBODIMENTS

The embodiments of the present invention are now explained in detail with reference to the drawings. In the following embodiments, a facsimile apparatus is shown as the image communication apparatus.

Figure 1:
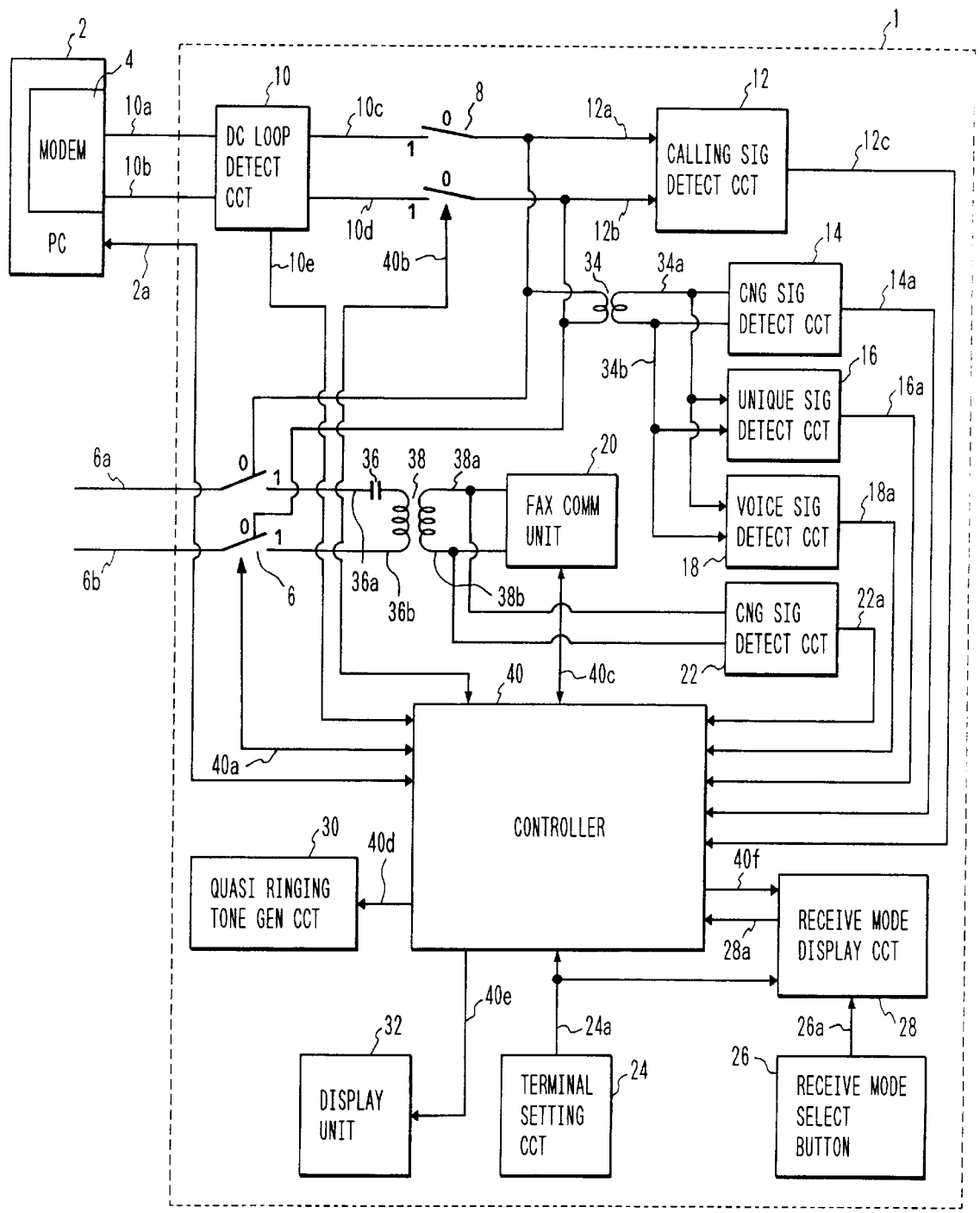
FIG. 1 shows a block diagram of a configuration of a facsimile apparatus in accordance with a first embodiment of the present invention.
Figure 2A:
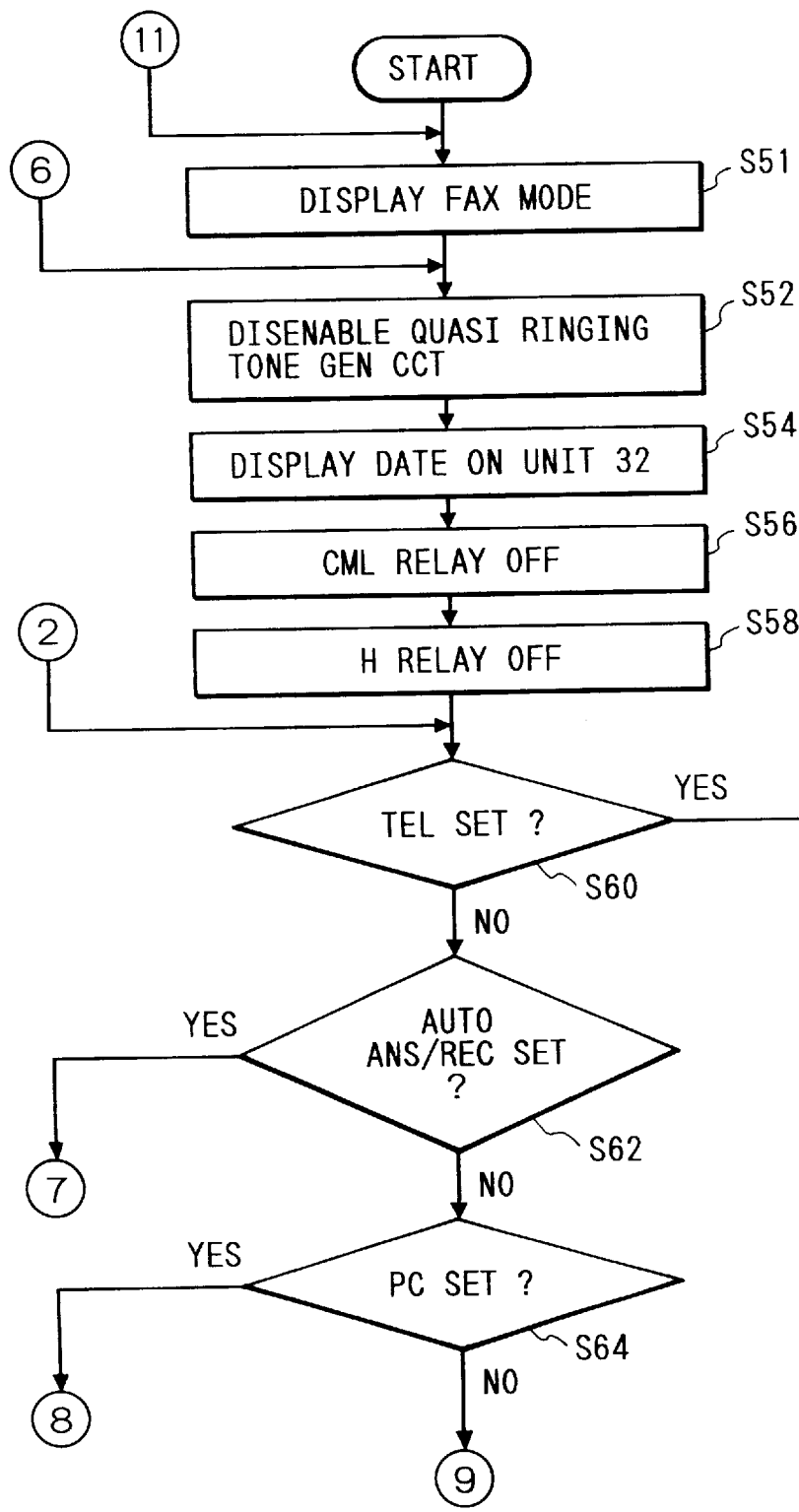
FIG. 2 which is composed of FIGS. 2A and 2B shows a flow chart of an operation of the first embodiment.
Figure 2B:
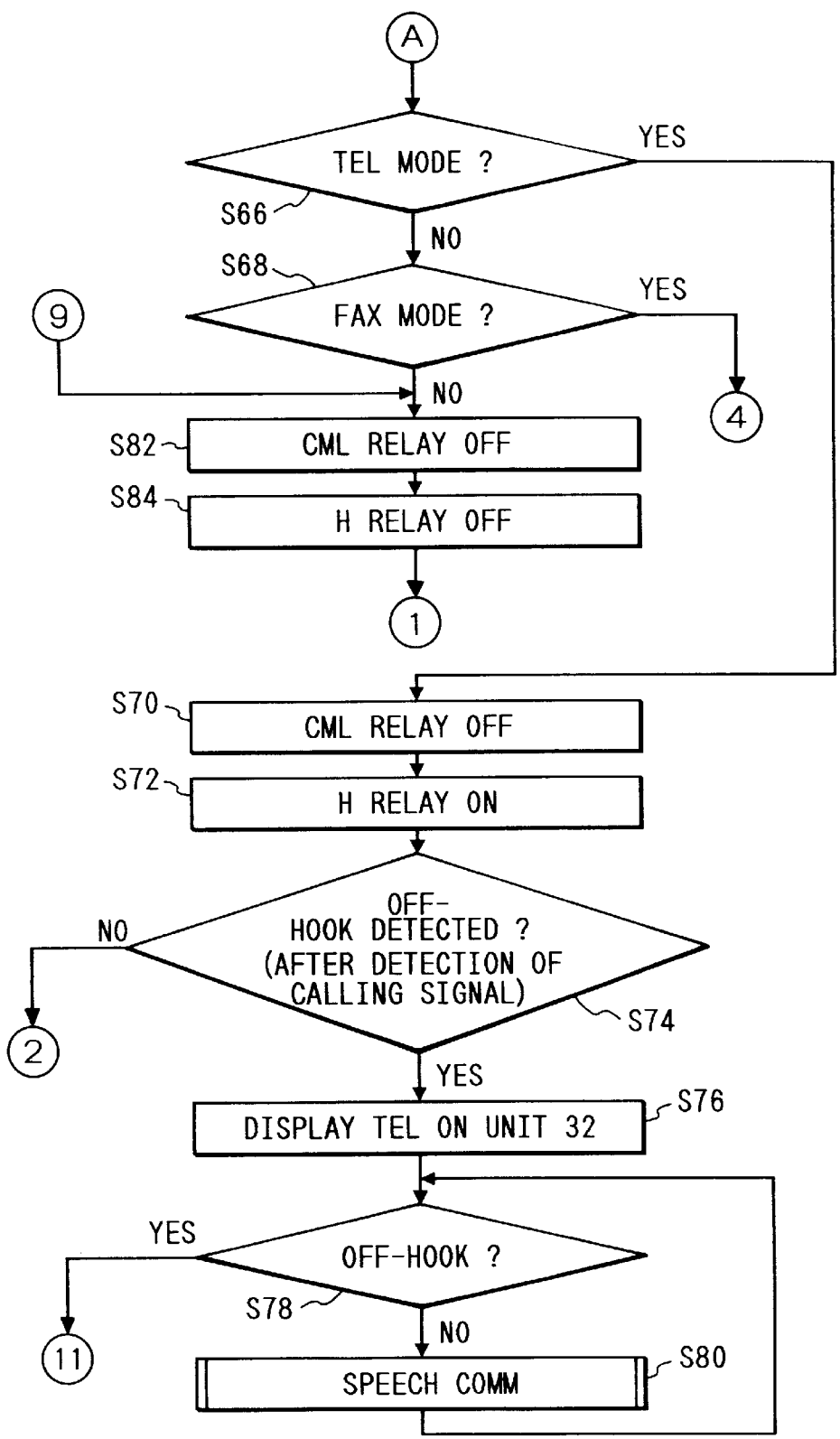
Figure 4:
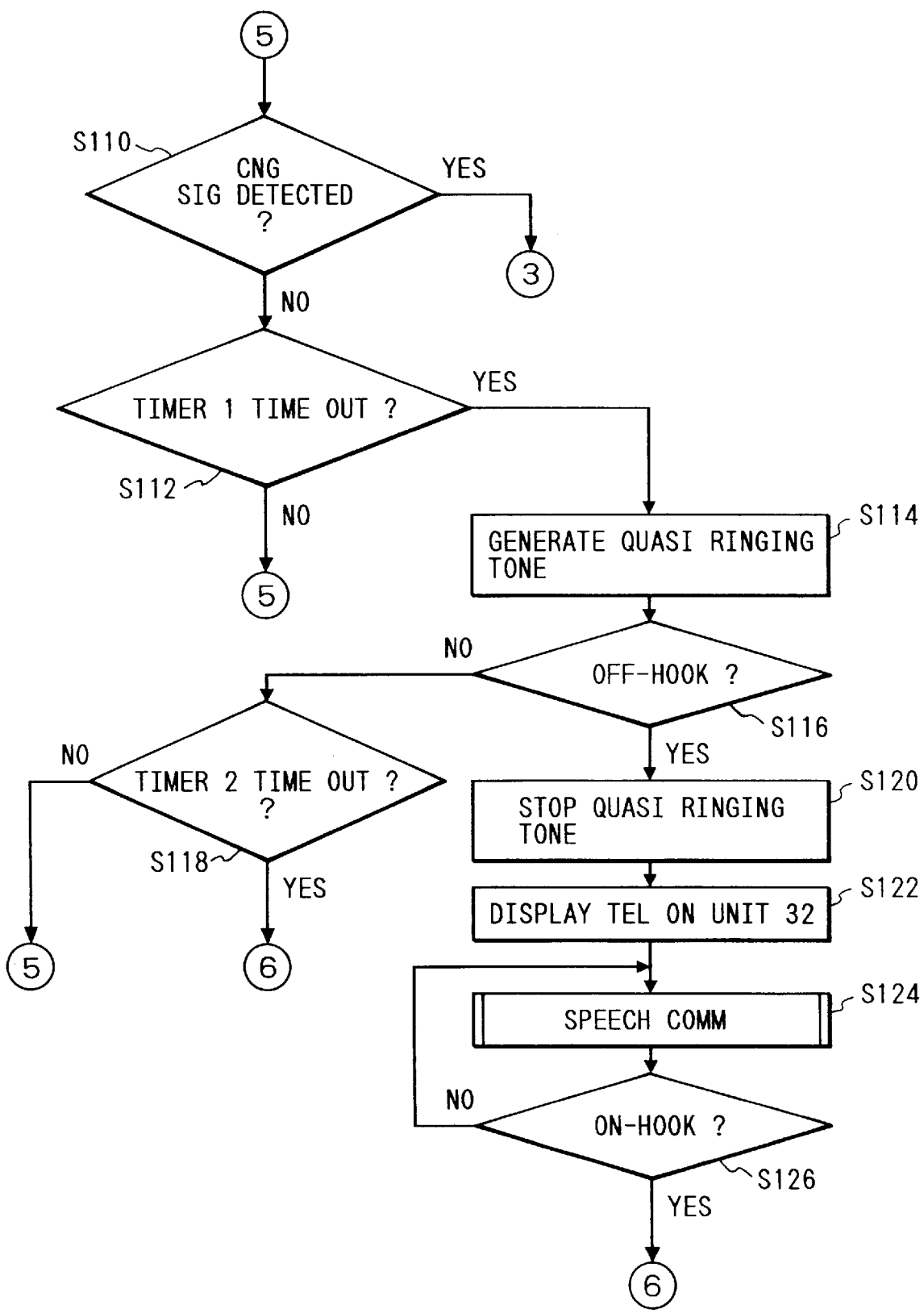
FIG. 4 shows a flow chart of an operation of the first embodiment.

FIG. 1 shows a block diagram of a configuration of a facsimile apparatus in accordance with a first embodiment of the present invention.

In FIG. 1, an external information processing terminal (personal computer) 2 has a modem which is connectable to a line terminal of a facsimile apparatus 1 so that signals are exchanged between the personal computer 2 and the facsimile apparatus 1 through an interface of a signal line 2a. A modem 4 in the personal computer 2 is connected to the facsimile apparatus 1 by signal lines 10a and 10b as a line terminal and connected to a telephone line through the facsimile apparatus.

When a signal of a signal level '0' is outputted to a signal line 40a, a CML relay 6 connects a telephone line and a signal line 6a and 6b to signal lines 12a and 12b, and when a signal of a signal level '1' is outputted, it connects the telephone line and the signal line 6a and 6b to signal lines 36a and 36b.

An H relay 8 renders the signal lines 12a and 12b open when the signal of the signal level '0' is outputted to a signal line 40b from a control circuit 40, and connects the signal lines 12a and 12b to signal lines 10c and 10d when the signal of the signal level '1' is outputted to the signal line 40b.

A DC loop detection circuit 10 detects a DC loop of a line by the terminal connected to the line terminal, and the signal line 10a of the line terminal is connected to the output signal line 10c and the signal line 10b is connected to the output signal line 10d. When the terminal connected to the signal lines 10a and 10b makes the line connected, a signal of the signal level '1' is outputted to the output signal line 10c, and when the terminal connected to the signal lines 10a and 10b does not make the line connected, a signal of the signal level '0' is outputted to the output signal line 10c.

A call signal detection circuit 12 receives a signal outputted to the signal lines 12a and 12b, and when it detects a call signal, it outputs a signal of the signal level '1' to the signal line 12c, and when it does not detect the call signal, it outputs a signal of the signal level '0' to the signal line 12c.

A CNG signal detection circuit 14 receives information outputted to signal lines 34a and 34b, and when it detects a CNG signal, it outputs a signal of the signal level '1' to a signal line 14a, and when it does not detect the CNG signal, it outputs a signal of the signal level '0' to the signal line 14a.

A significant (or unique) signal detection circuit 16 receives information outputted to the signal lines 34a and 34b, and when it detects a significant (or unique) signal for data communication by the computer, it outputs a signal of the signal level '1' to a signal line 16a, and when it does not detect the significant signal for the data communication, it outputs a signal of the signal level '0' to the signal line 16a.

A speech (or voice) signal detection circuit 18 receives information outputted to the signal lines 34a and 34b, and when it detects speech, it outputs a signal of the signal level '1' to a signal line 18a, and when it does not detect the speech, it outputs a signal of the signal level '0' to the signal line 18a.

A facsimile communication unit 20 transmits and receives signals under the control of a signal line 40c through signal lines 38a and 38b.

A CNG signal detection circuit 22 receives information outputted to the signal lines 38a and 38b, and when it detects a CNG signal, it outputs a signal of the signal level '1', and when it does not detect the CNG signal, it outputs a signal of the signal level '0'.

A terminal setting circuit 24 sets a terminal to be connected to the line. As a user selects from a telephone set, automatic answering recording and a PC (personal computer), it is set. When setting information is unregistered, a signal '0' is outputted to a signal line 24a, when the telephone set is set, a signal '1' is outputted to the signal line 24a, when the automatic answering is set, a signal '2' is outputted to the signal line 24a, and when the PC is set, a signal '3' is outputted to the signal line 24a.

A call receive mode selection button 26 selects a call receive mode. Each time the button 26 is depressed, a depression pulse is generated on a signal line 26a.

A call receive mode display circuit 28 displays 'fax' when a clear pulse is generated on a signal line 40f. When it receives the information on the signal line 24a indicating the unregistered state, it does not change the display of 'fax' even if the depression pulse is generated on the signal line 26a. When it receives the information on the signal line 24a indicating the setting of the telephone set, it changes the display in a manner of fax→tel→fax/tel switching→fax each time the depression pulse is generated on the signal line 26a. When it receives the information on the signal line 24a indicating the setting of the automatic answering, it changes the display in a manner of fax→automatic answering prioritized→fax each time the depression pulse is generated on the signal line 26a. When it receives the information on the signal line 24a indicating the setting of the PC, it changes the display in a manner of fax→PC prioritized→fax.

The 'fax' indicates a facsimile mode, the 'tel' indicates a telephone mode and the 'fax/tel switching' indicates a facsimile/telephone automatic switching mode. When the 'fax' is displayed, the signal '0' is outputted to the signal line 28a, and when the 'PC prioritized', 'automatic answering prioritized', 'tel' and 'fax/tel switching' are displayed, the signals '1', '2', '3' and '4' are outputted to the signal line 28a, respectively.

A quasi-ringing tone generation circuit 30 does not generate a quasi-ringing tone when the signal level '0' is outputted to a signal line 40d, and generates the quasi-ringing tone when the signal level '1' is outputted to the signal line 40d.

A display unit 32 displays a current year-month-day-time when the signal '0' is outputted to a signal line 40e, and displays communication, automatic answering, telephone and PC when the signals '1', '2', '3' and '4' are outputted to the signal lines 40e, respectively.

A transformer 34 detects a signal when a CML relay 6 is connected to the PC 2 and a capacitor 36 is a DC-blocking capacitor. A transformer 38 is a DC overlapped transformer for transferring a signal when the CML relay 6 is connected to the facsimile communication unit 20.

A control circuit 40 controls the overall facsimile apparatus, and in the first embodiment, it controls the following.

First, when the 'fax' is selected as the display of the call receive mode, a calling signal is not outputted to the line terminal but as soon as the calling signal is detected, the facsimile communication is started.

When the 'PC prioritized' is selected as the display of the call receive mode, the telephone line is connected to the line terminal (personal computer) and the calling signal is detected, and when a signal indicating the facsimile communication is received within a predetermined time interval after the detection of the line connection of the PC, the telephone line is switched to the facsimile communication unit to start the facsimile communication.

When the 'tel' is selected as the display of the call receive mode, the calling signal is merely outputted to the line terminal. When the 'fax/tel switching' is selected as the display of the call receive mode, the calling signal is not outputted to the line terminal but the telephone line is connected to the facsimile apparatus as soon as the calling signal is detected, and when the CNG signal is detected within a predetermined time interval, the facsimile communication is started, and if the CNG signal is not detected within the predetermined time interval, an operator is called and the speech state is set after the detection of off-hook.

When the 'automatic answering prioritized' is selected as the display of the receive mode, the calling signal is outputted to the line terminal, and when the signal indicating the facsimile communication is detected within a predetermined time interval after the detection of the calling signal and the line connection of the automatic answering, the telephone line is switched to the facsimile communication unit to start the facsimile communication.

FIGS. 2A to 6 show flow charts of the control of the control circuit 40. A control program for executing the flows is stored in a read-only memory (ROM) in the control circuit 40.

In S51, a clear pulse is generated on a signal line 40f and the 'fax' is displayed by the circuit 28 as the call receive mode. In S52, a signal of the signal level '0' is outputted to the signal line 40d to set the non-generation of the quasi-ringing tone. In S54, a signal '0' is outputted to the signal line 40e and the circuit 32 displays the year-month-day-time.

Then, in S56, a signal of the signal level '0' is outputted to the signal line 40a to turn off the CML relay 6. In S58, a signal of the signal level '0' is outputted to the signal line 40b to turn off the H relay 8.

In S60, S62 and S64, the information on the signal line 24a is received to check the setting of the terminal connected to the line, and if it is the setting of the telephone set, the process proceeds to S66, if it is the setting of the automatic answering recording the process proceeds to S128, if it is the setting of the PC, the process proceeds to S150, and if no setting, the process proceeds to S82.

In S66 and S68, the information on the signal line 28a is received to check the display of the call receive mode, and if it is the display of 'tel', the process proceeds to S70, if it is the display of 'fax', the process proceeds to S82, and if it is the display of 'fax/tel switching' (YES in S68), the process proceeds to S98.

In S70, a signal of the signal level '0' is outputted to the signal line 40a to turn off the CML relay 6. In S72, a signal of the signal level '1' is outputted to the signal line 40b to turn on the H relay 8.

In S74, the information on the signal line 12c is received to detect the calling signal. Whether the off-hook was subsequently detected or not is determined, and if YES, the process proceeds to S76, and if NO, the process proceeds to S60.

In S76, the 'telephone' is displayed on the display unit 32 through the signal line 40e. In S78, whether the on-hook was made or not is determined, and if it was made, the process proceeds to S52, and if it was not made, the process proceeds to S80.

In S82, a signal of the signal level '0' is outputted to the signal line 40a to turn off the CML relay 6. In S84, a signal of the signal level '0' is outputted to the signal line 40b to turn off the H relay 8.

In S86, the information on the signal line 12c is received to determine whether the calling signal was received or not. If the calling signal is detected, the process proceeds to S88, and if the calling signal is not detected, the process proceeds to S60.

In S88, the 'communication' is displayed on the display unit 32 through the signal line 40e. In S90, a signal of the signal level '1' is outputted to the signal line 40a to turn on the CML relay 6. Then, S92 represents a pre-protocol (pre-procedure), S94 represents image transmission and S96 represents a post protocol (post procedure).

In S98, a signal of the signal level '0' is outputted to the signal line 40a to turn off the CML relay. In S100, a signal of the signal level '0' is outputted to the signal line 40b to turn off the H relay 8 to prevent the calling signal from being outputted to the external line (signal lines 10a, 10b).

In S102, the information on the signal line 12c is received to determine whether the calling signal was detected or not. If the calling signal was detected, the process proceeds to S104, and if the calling signal was not received, the process proceeds to S60.

In S104, a signal of the signal level '1' is outputted to the signal line 40a to turn off the CML relay. In S106, a timer 1 is set to 10 seconds and a timer 2 is set to 35 seconds.

In S110, the information on the signal line 22a is received to determine whether the CNG signal was detected by the detection circuit 22 or not, and if the CNG signal was detected, it means the facsimile communication and the process proceeds to S88, and if the CNG signal was not received, the process proceeds to S112.

In S112, the time-out of the timer 1 is checked. When the timer 1 times out, the process proceeds to S114 to output a signal of the signal level '1' to the signal line 40d to generate the quasi-calling tone and call the operator. If the timer 1 does not time out, the process proceeds to S110.

In S116, the off-hook is checked by a detection circuit, not shown, and when the off-hook is detected, the process proceeds to S120 to output a signal of the signal level '0' to the signal line 40d and interrupt the generation of the quasi-calling tone, and if the off-hook is not detected, the process proceeds to S118.

In S118, whether the timer 2 timed out or not is determined. If the timer 2 times out, the process proceeds to S52, and if the timer 2 does not time out, the process proceeds to S110.

In S120, the generation of the quasi-calling tone is stopped and in S122, the 'telephone' is displayed through the signal line 40e. In S124, the speech is conducted.

In S126, whether the off-hook was made or not is determined by a detection circuit, not shown, and if the off-hook was made, the process proceeds to S52, and if the off-hook was not made, the process proceeds to S124.

In S128, the information on the signal line 28a is received to check the display of the call receive mode. If it is the display of the automatic answering prioritized, the process proceeds to S130, and if it is not the display of the automatic answering prioritized, it means the display of the fax prioritized and the process proceeds to S82.

In S130, a signal of the signal level '0' is outputted to the signal line 40a to turn off the CML relay 6. In S132, a signal of the signal level '1' is outputted to the signal line 40b to turn on the H relay 8 to set a condition in which the calling signal is outputted directly to the external line (signal lines 10a, 10b).

In S134, the information on the signal line 12c is received to determine whether the calling signal was received or not, and if the calling signal was received, the process proceeds to S136, and if the calling signal was not received, the process proceeds to S60.

In S136, the information on the signal line 10c is received to determine whether the external automatic answering recording telephone set made the line connect or not. If it made, the process proceeds to S188, and if it did not make, the process proceeds to S134.

In S138, the timer 1 is set to 10 seconds. In S140, the information on the signal line 14a is received to determine whether the CNG signal was detected or not, and if the CNG signal was detected, it means the fax communication and the process proceeds to S88, and if the CNG signal was not received, the process proceeds to S142.

In S142, whether the timer 1 timed out or not is determined. If the timer 1 timed out, the process proceeds to S144, and if the timer 1 did not time out, the process proceeds to S140.

In S144, the automatic answering recording is displayed on the display unit 32 through the signal line 40e. In S146, the automatic answering recording operation is conducted by the external automatic answering recording telephone set. In S148, the information on the signal line 10c is received to determine whether the external automatic answering recording telephone set broke the line or not, and if the external automatic answering recording telephone set broke the line, the process proceeds to S52 and if it did not break the line, the process proceeds to S146.

In S150, the information on the signal line 28a is received to check the display of the call receive mode, if it is the display of the PC prioritized, the process proceeds to S152, and if it is not the display of the PC prioritized, it means the display of the fax prioritized and the process proceeds to S82.

In S152, a signal of the signal level '0' is outputted to the signal line 40a to turn off the CML relay 6. In S154, a signal of the signal level '1' is outputted to the signal line 40b to turn on the H relay 8 to set such that the calling signal is outputted directly to the external line (signal lines 10a, 10b).

Then, in S156, the information on the signal line 12c is received to determine whether the calling signal was detected or not. If the calling signal was detected, the process proceeds to S158 and if the calling signal was not detected, the process proceeds to S60.

In S158, the information on the signal line 10c is received to determine whether the external personal computer (PC) made the line or not. If the external PC made the line, the process proceeds to S160, and if it did not make, the process proceeds to S156.

In S160, the timer 1 is set to 10 seconds. In S162, the information on the signal line 14a is received to determine whether the CNG signal was detected or not. If the CNG signal was detected, it means the fax communication and the process proceeds to S88, and if the CNG signal was not detected, the process proceeds to S164.

In S164, whether the timer 1 timed out or not is determined. If the timer 1 timed out, the process proceeds to S166, and if the timer 1 did not time out, the process proceeds to S162. During the control of S162 and S164, the PC may communicate with a destination PC.

In S166, the PC is displayed on the display unit 32 through the signal line 40e. In S168, the PC communicates with the destination PC. In S170, the information on the signal line 10c is received to determine whether the external PC completed the communication and broke (or released) the line or not. If the external PC broke the line, the process proceeds to S52, and if the external PC is in the process of communication and the line is not broken, the process proceeds to S168.

In this manner, the external PC 2 connected to the line terminal of the facsimile apparatus 1 communicates with the destination PC.

A second embodiment of the present invention is now explained.

In the second embodiment, when the personal computer (PC) is selected as the terminal connected to the line (signal lines 10a, 10b) in the first embodiment and the call receive mode with the PC prioritized is selected by the display unit 28, the calling signal is outputted to the line terminal and if a signal indicating the facsimile communication is detected within a predetermined time interval after the detection of the line connection of the PC which detected the calling signal, the telephone line is switched to the facsimile communication unit 20 to start the facsimile communication, and if a signal indicating the data communication is detected within the predetermined time interval, the PC communication is continued without detecting the signal indicating the facsimile communication in the current call connection.

Figure 5:
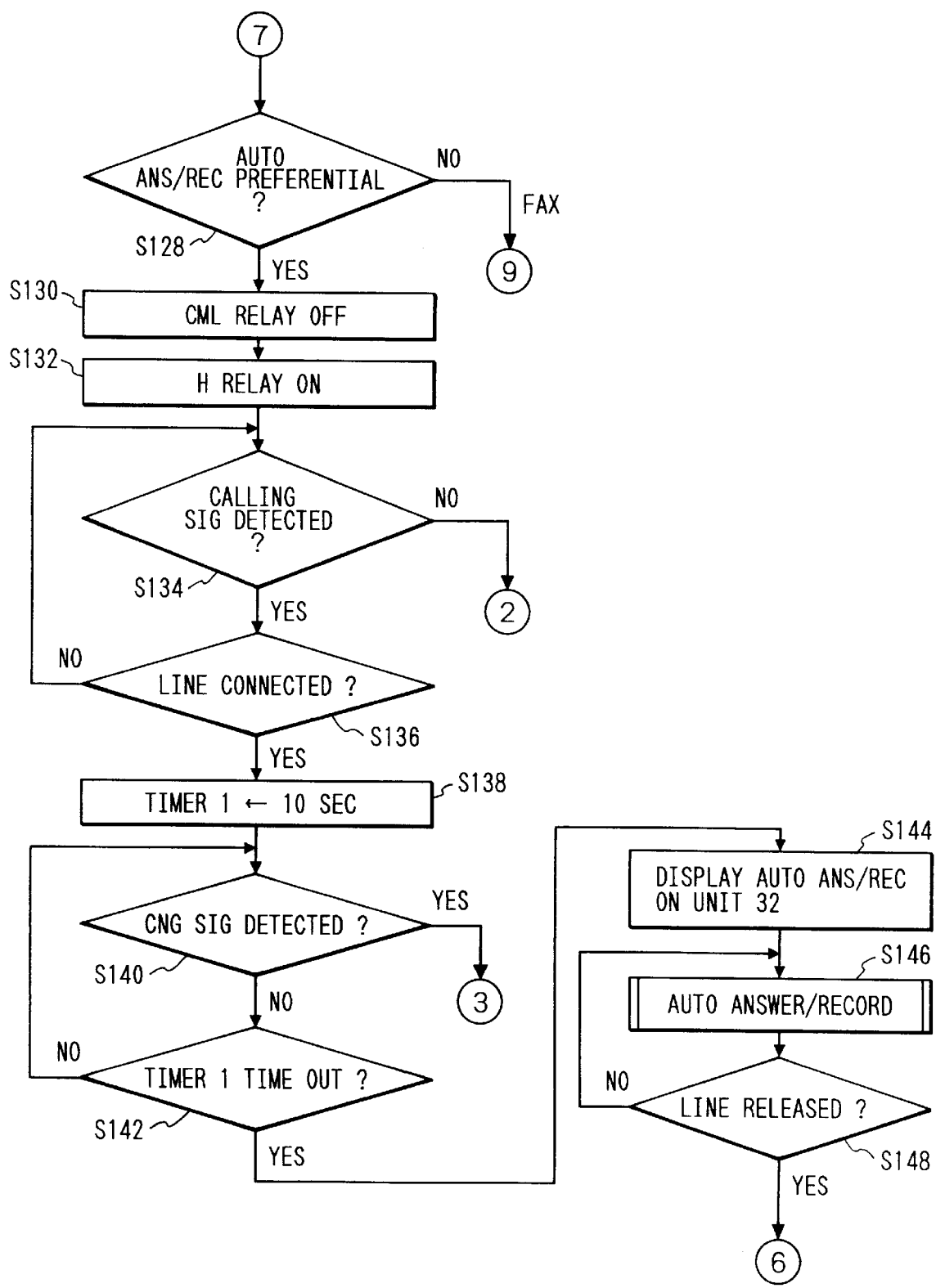
FIG. 5 shows a flow chart of an operation of the first embodiment.
Figure 6:
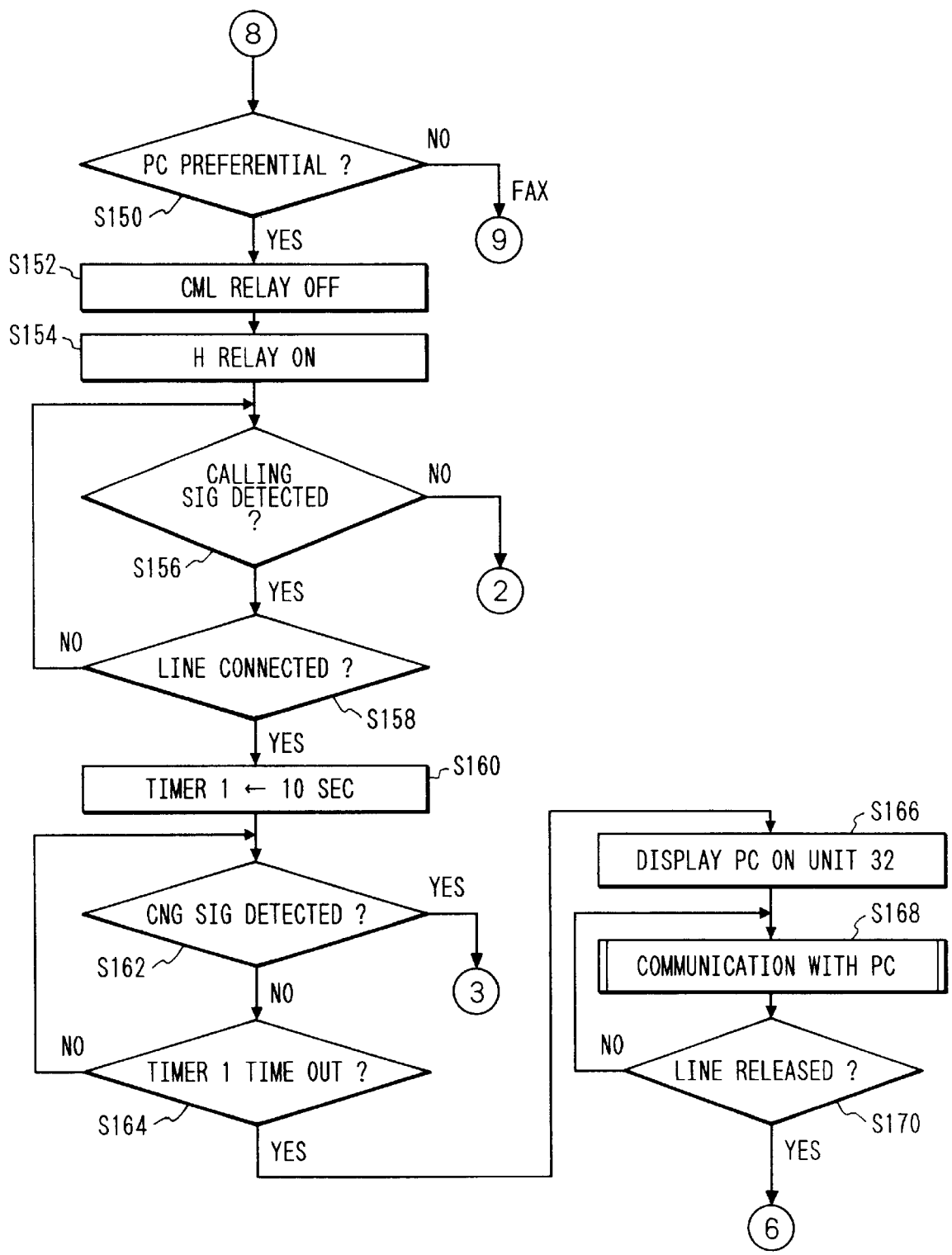
FIG. 6 shows a flow chart of an operation of the first embodiment.
Figure 7:
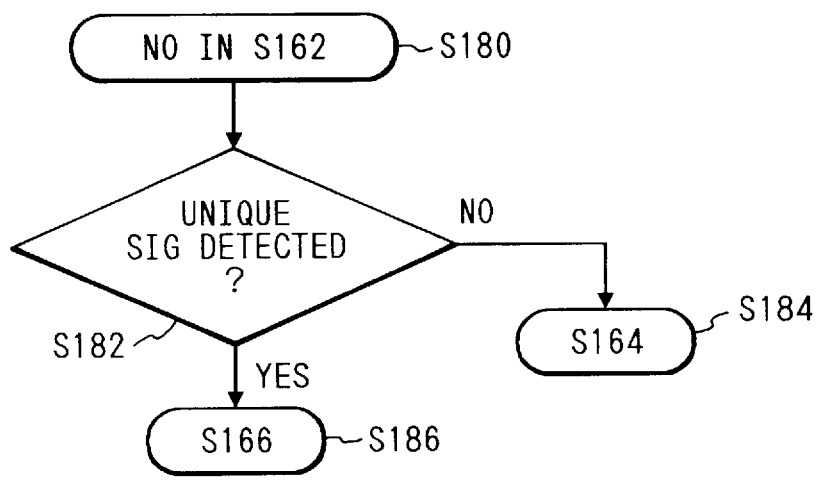
FIG. 7 shows a flow chart of an operation of a second embodiment.

FIG. 7 shows a flow chart of a portion of the operation of the control circuit 40 of the second embodiment which differs from the first embodiment (FIGS. 2A to 6).

First, S180 in FIG. 7 represents NO in S162 of FIG. 6. In S182, the information on the signal line 16a is received to determine whether a significant (or unique) signal representing the data communication (a training signal in a data communication modem) was detected or not. If it was detected, the process proceeds to S186 (S166 in FIG. 6) and the PC communication is exclusively conducted without detecting the CNG signal. If the significant signal representing the data communication was not detected, the process proceeds to S184 (S164 in FIG. 6).

A third embodiment of the present invention is now explained.

In the third embodiment, when the automatic answering recording telephone set is selected as the terminal connected to the line (signal lines 10a, 10b) in the first embodiment and the call receive mode of the automatic answering prioritized is selected by the display unit 128, the calling signal is outputted to the line terminal and if a signal representing the facsimile communication is detected within a predetermined time interval after the detection of the line connection by the automatic answering recording telephone set which detected the calling signal, the telephone line is switched to the facsimile communication unit 20 to start the facsimile communication, and if the speech is detected within the predetermined time interval, the signal indicating the facsimile communication is not detected in the call connection.

Figure 8:
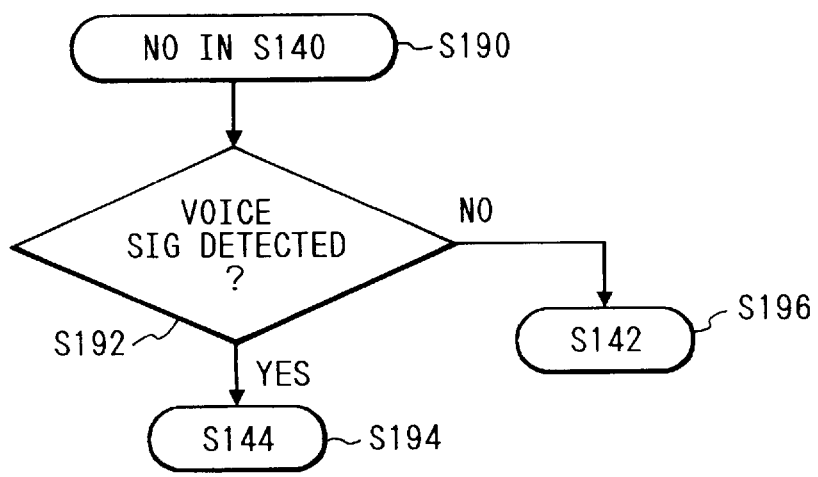
FIG. 8 shows a flow chart of an operation of a third embodiment.

FIG. 8 shows a flow chart of a portion of the operation of the control circuit 40 in the third embodiment which differs from the first embodiment (FIGS. 2A to 6).

First, S190 of FIG. 8 represents NO of S140 in FIG. 5. In S192, the information on the signal line 18a is received to determine whether the speech was detected or not. If the speech was detected, the process proceeds to S195 (S144 in FIG. 5) and the CNG signal is not subsequently detected. If the speech was not detected, the process proceeds to S196 (S142 in FIG. 5).

In the above embodiments, when the CNG signal is detected during the connection of the personal computer for the call reception from the line, the line is automatically switched to the facsimile apparatus. However, in this case, the personal computer is forcibly disconnected from the line and the data communication in the personal computer ends in error.

A modem of the personal computer is, in many cases, arranged on a card and when such a modem card is connected to the line and an abnormal voltage such as thunder is applied to the line, the modem of the personal computer may be broken.

Thus, when the line is switched from the personal computer to the facsimile apparatus by the detection of the CNG signal while the line is connected to the personal computer when the call is received, the shift to the facsimile communication is informed to the personal computer. Further, in a line switching unit of the facsimile apparatus, an arrester is inserted between the line and a frame ground to connect the personal computer to the line through the line switching unit to protect the modem of the personal computer against the abnormal voltage. This is explained below as a fourth embodiment of the present invention.

Figure 9:
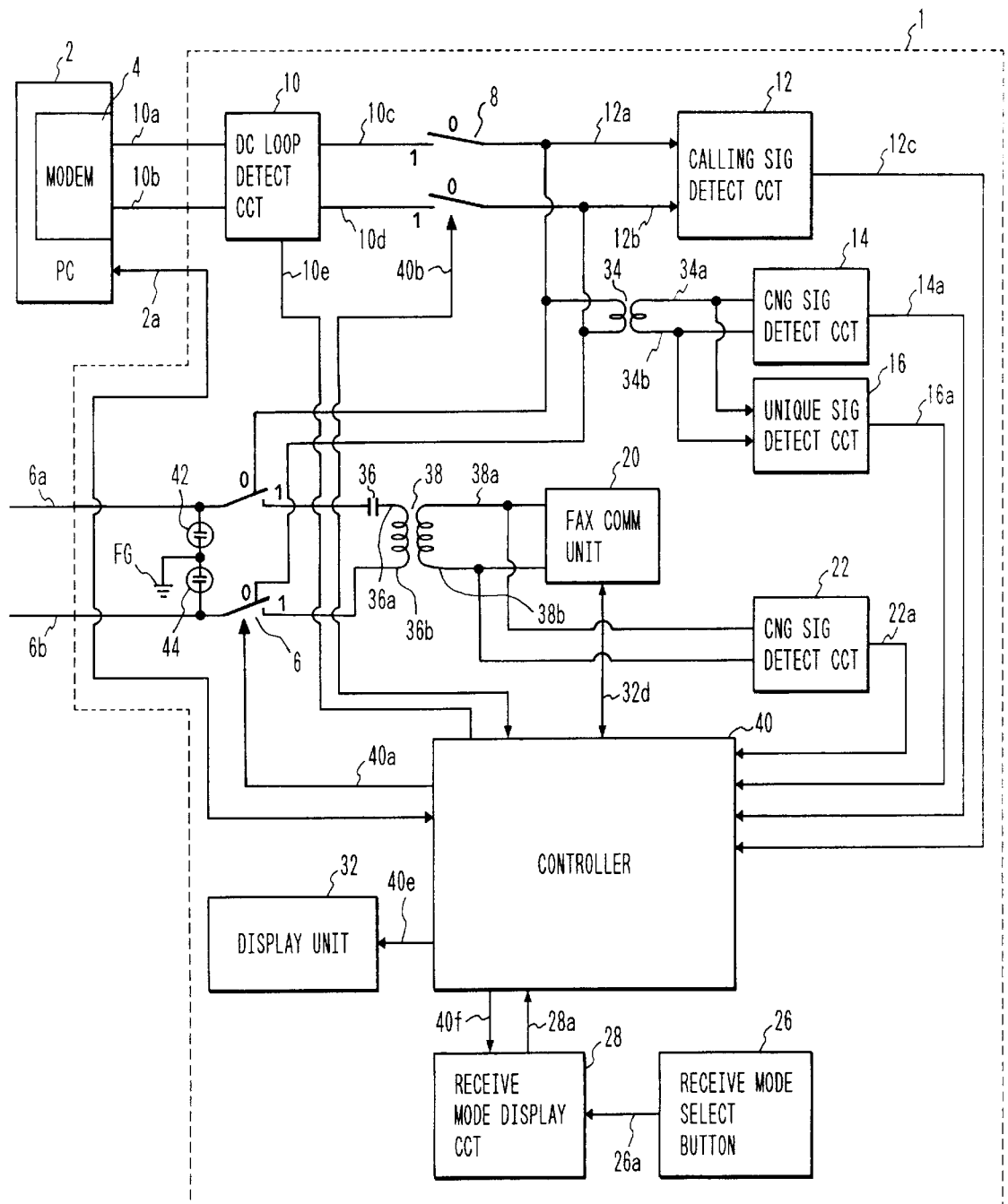
FIG. 9 shows a block diagram of a configuration of a facsimile apparatus in accordance with a fourth embodiment.

FIG. 9 shows a block diagram of a configuration of the facsimile apparatus of the fourth embodiment. In FIG. 9, the like numerals to those shown in FIG. 1 denote the like elements to those shown in FIG. 1 and the explanation thereof is omitted. In FIG. 9, the speech signal detection circuit 18, the terminal setting circuit 24 and the quasi-calling tone generation circuit 30 are eliminated and arresters 42 and 44 are added.

The arresters 42 and 44 are of 350 V specification for the facsimile apparatus shipped to the US and Japan, and of 420 V specification for the facsimile apparatus shipped to the Europe.

If thunder occurs between the lines, that is, between the signal lines 6a and 6b, a discharge occurs if the voltage exceeds a series-connected voltage of the arresters 42 and 44 (700 V for the US and Japan, and 840 V for the Europe). When thunder occurs between the line (one of the signal lines 6a and 6b) and the frame ground (FG), discharge occurs if a voltage exceeds 350 V for the US and Japan, and 420 V for the Europe in the arrester 42 or 44.

Thus, even if the thunder occurs between lines or between the line and the frame ground, it is not transmitted to the modem of the personal computer and the modem is prevented from the break.

The control circuit 40 controls the overall facsimile apparatus and in the fourth embodiment, it controls the following.

First, when the fax is selected as the display of the call receive mode, the calling signal is not outputted to the line terminal but the facsimile communication is started as soon as the calling signal is detected.

When the PC prioritized is selected as the display of the call receive mode, the telephone line is connected to the line terminal (personal computer) and if a signal indicating the facsimile communication is detected within a predetermined time interval after the detection of the calling signal and the line connection of the personal computer, the telephone line is switched to the facsimile communication unit to start the facsimile communication. The shift to the facsimile communication is informed to the personal computer through the interface 2a which exchanges signals between the personal computer and the facsimile apparatus.

Figure 10:
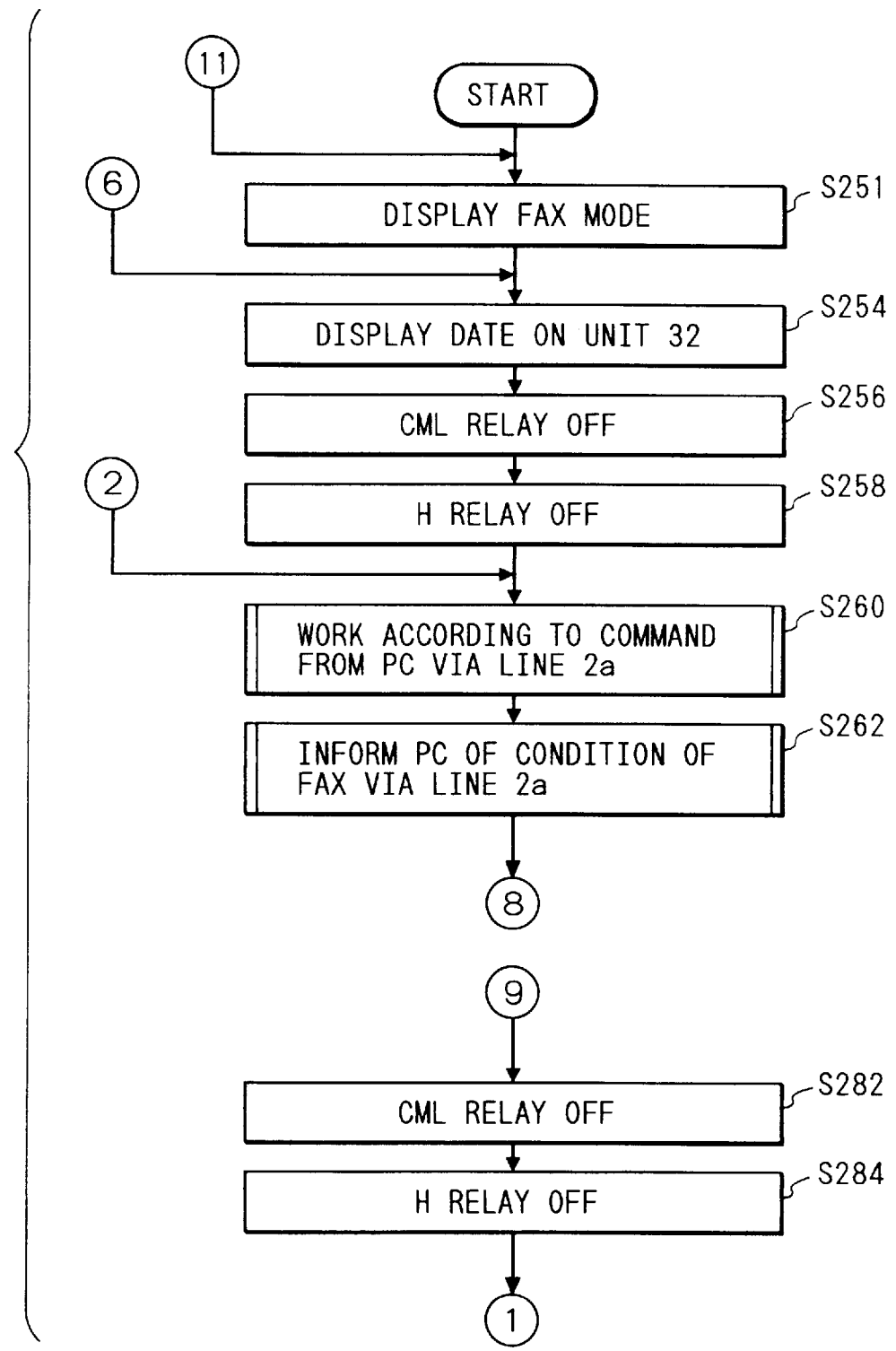
FIG. 10 shows a flow chart of an operation of the fourth embodiment.
Figure 11:
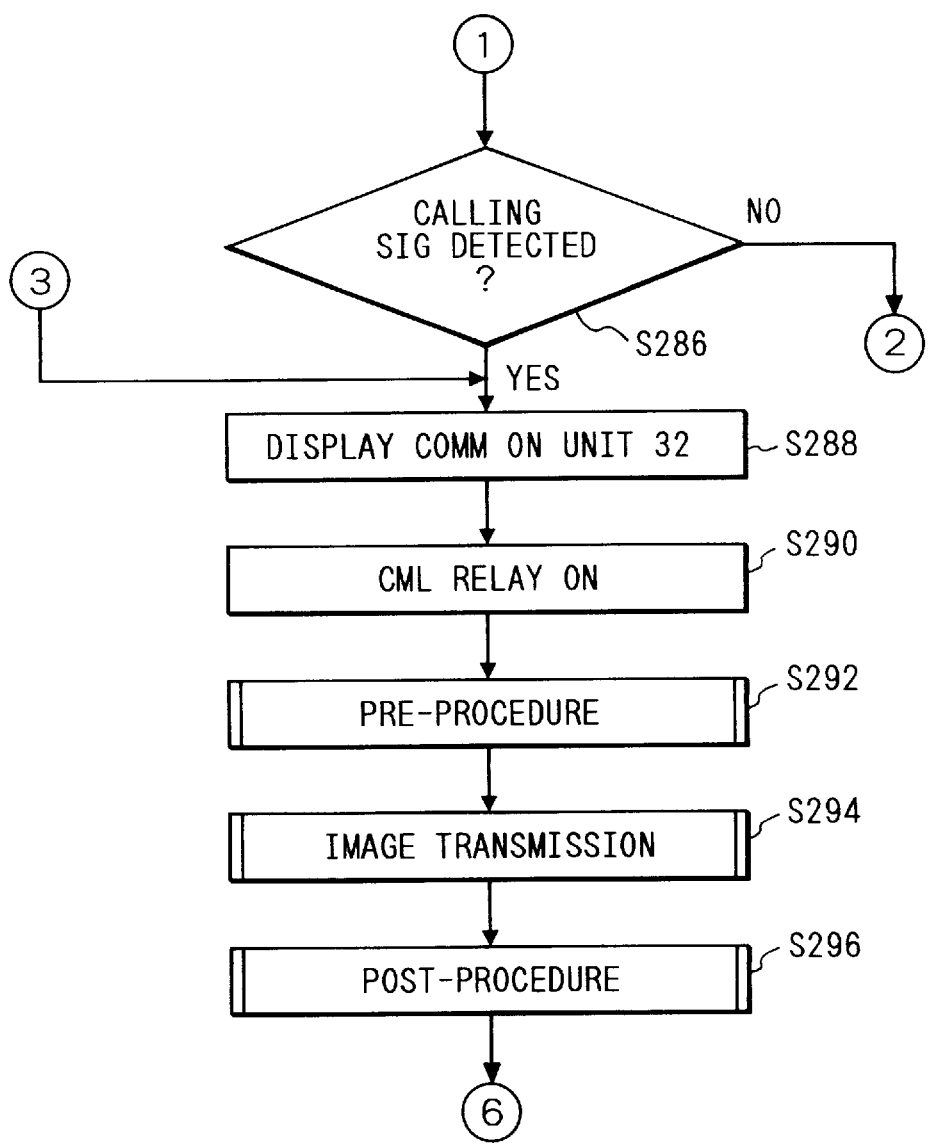
FIG. 11 shows a flow chart of an operation of the fourth embodiment.
Figure 12:
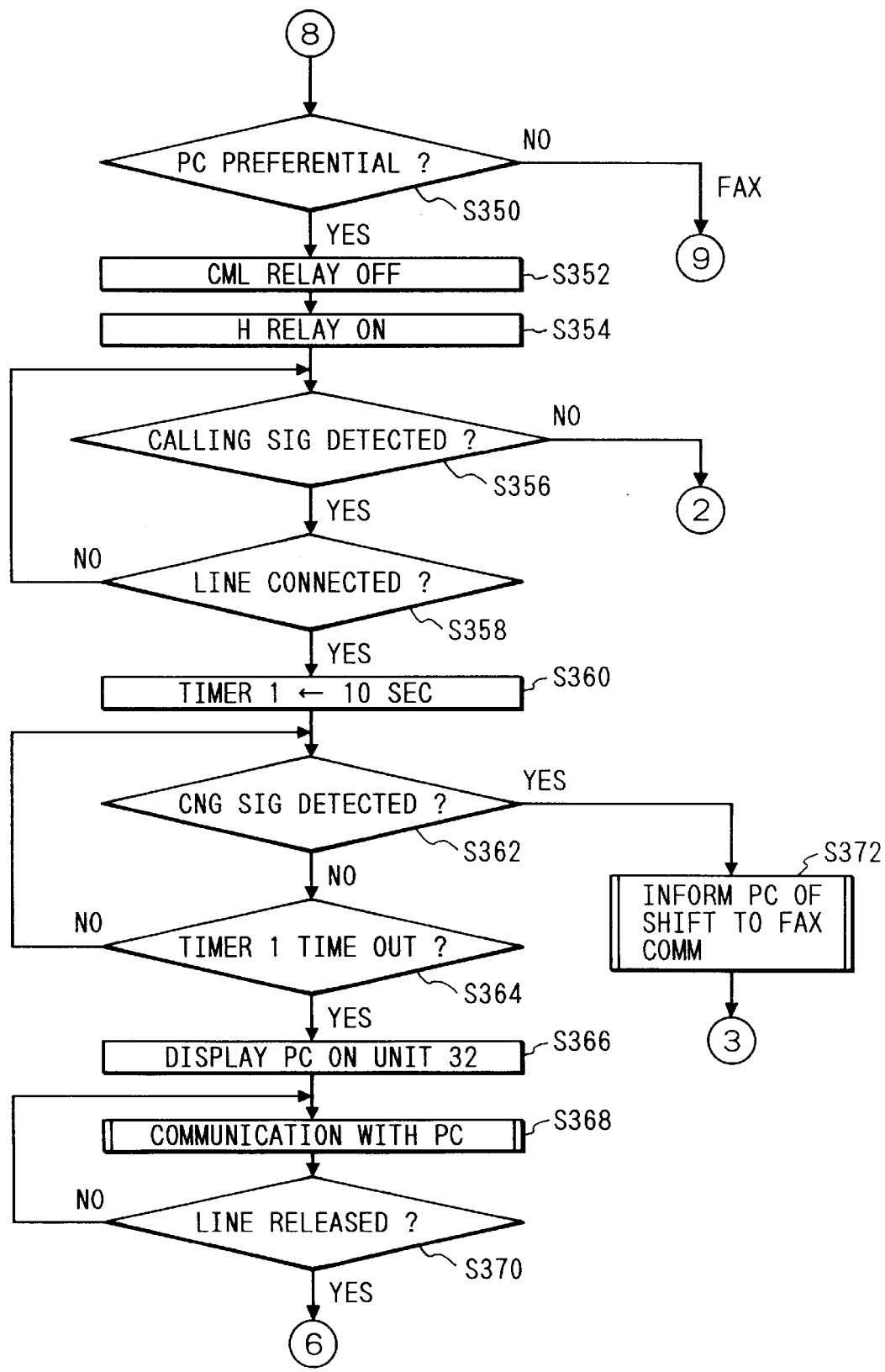
FIG. 12 shows a flow chart of an operation of the fourth embodiment.

FIGS. 10 to 12 show flow charts of a flow of the control by the control circuit 40.

First, in S251, a clear pulse is generated on the signal line 40f and the fax is displayed on the circuit 28 as the call receive mode. In S254, a signal '0' is outputted to the signal line 40e and the circuit 32 displays the year-month-day-time.

In S256, a signal of the signal level '0' is outputted to the signal line 40a to turn off the CML relay 6. In S258, a signal of the signal level '0' is outputted to the signal line 40b to turn off the H relay.

In S260, an operation is ready in accordance with a command from the personal computer 2 through the signal line 2a. In S262, the state of the facsimile apparatus is informed to the personal computer through the signal line 2a. Then, the process proceeds to S350.

Then, in S282, a signal of the signal level '0' is outputted to the signal line 40a to turn off the CML relay 6. In S284, a signal of the signal level '0' is outputted to the signal line 40b to turn off the H relay 8.

In S286, the information on the signal line 12c is received to determine whether the calling signal was detected or not. If the calling signal was detected, the process proceeds to S288, and if the calling signal was not detected, the process proceeds to S260.

In S288, the communication is displayed on the display unit 32 through the signal line 40e. In S290, a signal of the signal level '1' is outputted to the signal line 40a to turn on the CML relay 6. In S292, a pre-protocol (pre-procedure) is conducted, in S294, an image is transmitted, and in S296, a post protocol (post procedure) is conducted.

In S350, the information on the signal line 28a is received to check the display of the call receive mode. If it is the display of the PC prioritized, the process proceeds to S352, and if it is not the display of the PC prioritized, it means that it is the display of the fax prioritized and the process proceeds to S282.

In S352, a signal of the signal level '0' is outputted to the signal line 40a to turn off the CML relay 6. In S354, a signal of the signal level '1' is outputted to the signal line 40b to turn on the H relay 8 to set a condition in which the calling signal is outputted directly to the external line (signal lines 10a, 10b).

In S356, the information on the signal line 12c is received to determine whether the calling signal was detected or not. If the calling signal was detected, the process proceeds to S358 and if the calling signal was not detected, the process proceeds to S260.

In S358, the information on the signal line 10c is received to determine whether the external personal computer made the line or not. If the external personal computer made the line, the process proceeds to S360, and if the external personal computer did not make the line, the process proceeds to S356.

In S360, the timer 1 is set to 10 seconds. In S362, the information on the signal line 14a is received to determine whether the CNG signal was detected or not. If the CNG signal was detected, it means the fax communication and the process proceeds to S372, and if the CNG signal was not received, the process proceeds to S364.

In S364, whether the timer 1 timed out or not is determined. If the timer 1 timed out, the process proceeds to S366, and if the timer 1 did not time out, the process proceeds to S362. The personal computer may conduct the communication with a destination personal computer even during the control in S362 and S364.

In S366, the PC is displayed on the display unit 32 through the signal line 40e. In S368, the personal computer conducts a communication with the destination personal computer. In S370, the information on the signal line 10c is received to determine whether the external personal computer completed the communication and the line was broken or not. If the external personal computer broke the line, the process proceeds to S254, and if the external personal computer is in the process of communication and did not break the line, the process proceeds to S368.

In S372, the shift of the call receive mode to the facsimile communication is informed to the personal computer through the signal line 2a.

Figure 13:
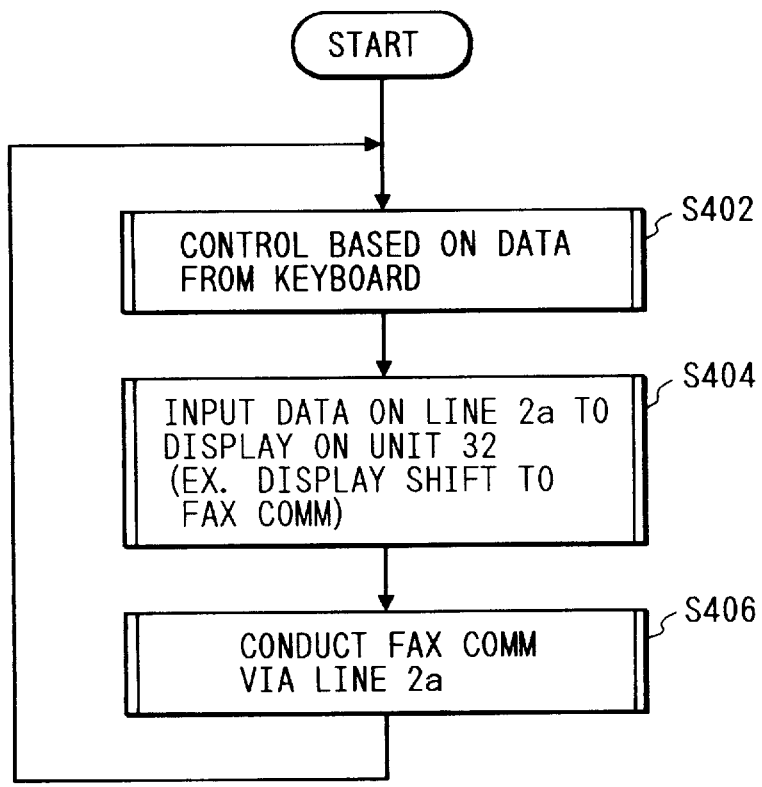
FIG. 13 shows a flow chart of an operation of a personal computer in the fourth embodiment.

On the other hand, FIG. 13 shows a flow chart of a flow of the control of the personal computer.

First, in S402, control is made in accordance with information specified from a keyboard. In S404, the information on the signal line 2a is received and displayed on the display unit. For example, when the shift of the call receive mode to the facsimile communication is informed through the signal line 2a, it is displayed.

In S406, the read information or received information from the facsimile apparatus is received and a predetermined control is applied thereto or the transmission information or the record information is outputted to the facsimile apparatus. The exchange with the facsimile apparatus is conducted through the signal line 2a.

A fifth embodiment of the present invention is now explained.

In the fifth embodiment, when the PC is selected as the terminal connected to the line (signal lines 10a, 10b) in the fourth embodiment and the call receive mode of the PC prioritized is selected by the display unit 28, the calling signal is outputted to the line terminal and if a signal indicating the facsimile communication is received within a predetermined time interval after the detection of the line connection of the PC which detected the calling signal, the telephone line is switched to the facsimile communication unit 20 to start the facsimile communication, and if a signal indicating the data communication is detected within the predetermined time interval, the PC communication is continued without detecting the signal indicating the facsimile communication in the call connection.

Figure 14:
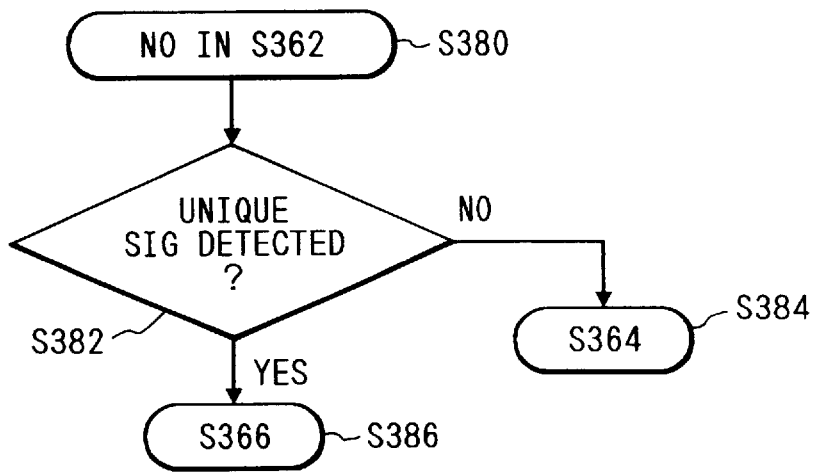
FIG. 14 shows a flow chart of an operation of a fifth embodiment.

FIG. 14 shows a flow chart of a portion of the operation of the control circuit 40 of the fifth embodiment which differs from the fourth embodiment (FIGS. 12 to 14).

First, S380 in FIG. 14 represents NO in S362 of FIG. 12. In S382, the information on the signal line 16a is received to determine if the significant signal representing the data communication (training signal of a modem of the data communication) was received or not. If the significant (or unique) signal representing the data communication was detected, the process proceeds to S386 (S366 in FIG. 12) and the PC communication is exclusively conducted without detecting the CNG signal. If the significant information representing the data communication was not detected, the process proceeds to S384 (S364 in FIG. 12).

A sixth embodiment of the present invention is now explained.

Figure 15:
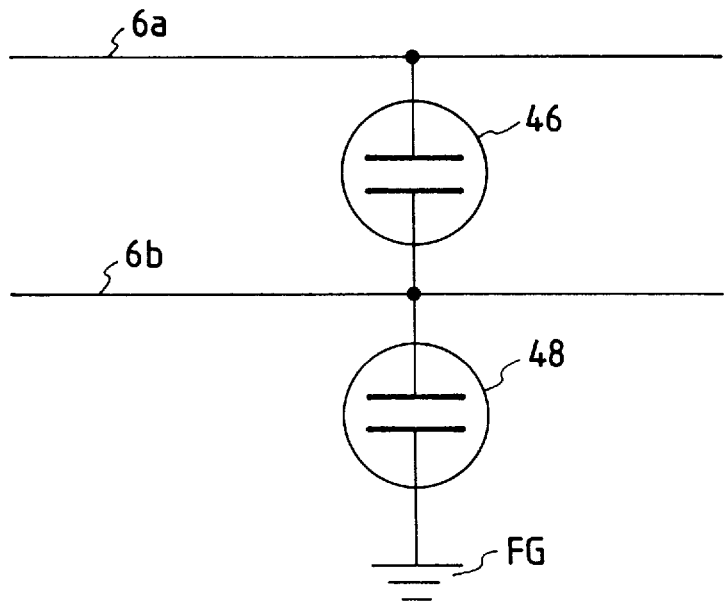
FIG. 15 shows a block diagram of an essential part of a sixth embodiment.

In the sixth embodiment, arresters for thunder are provided in a different connection from that of the fourth embodiment. As shown in FIG. 15, one arrester 46 is provided between lines, that is, between the lines 6a and 6b and the other arrester 48 is provided between the signal line 6b and the frame ground FG.

The arresters 46 and 48 are of 350 V specification for the facsimile apparatus shipped to the US and Japan, and of 420 V specification for the facsimile apparatus shipped to the Europe.

Thunder between lines (signal lines 6a, 6b) discharges at 350 V for the US and Japan and at 420 V for the Europe. Thunder between the signal line 6a and the frame ground discharges at 700 V for the US and Japan and at 840 V for the Europe. Thunder between the signal line 6b and the frame ground discharges at 350 V for the US and Japan and at 420 V for the Europe. The thunder is, in many cases, of 1 to 2 KV.

A seventh embodiment of the present invention is now explained.

In the seventh embodiment, the call receive mode of the facsimile apparatus is fax and a time from the detection of the calling signal to the shift to the automatic receiving mode is registered as 'a' second. A time from the detection of the calling signal by the personal computer to the shift to the automatic receiving mode is registered as 'b' second. By setting a>b, the data communication by the personal computer is conducted when the call is received, and by setting a<b, the facsimile communication by the facsimile apparatus is conducted when the call is received.

Figure 16:
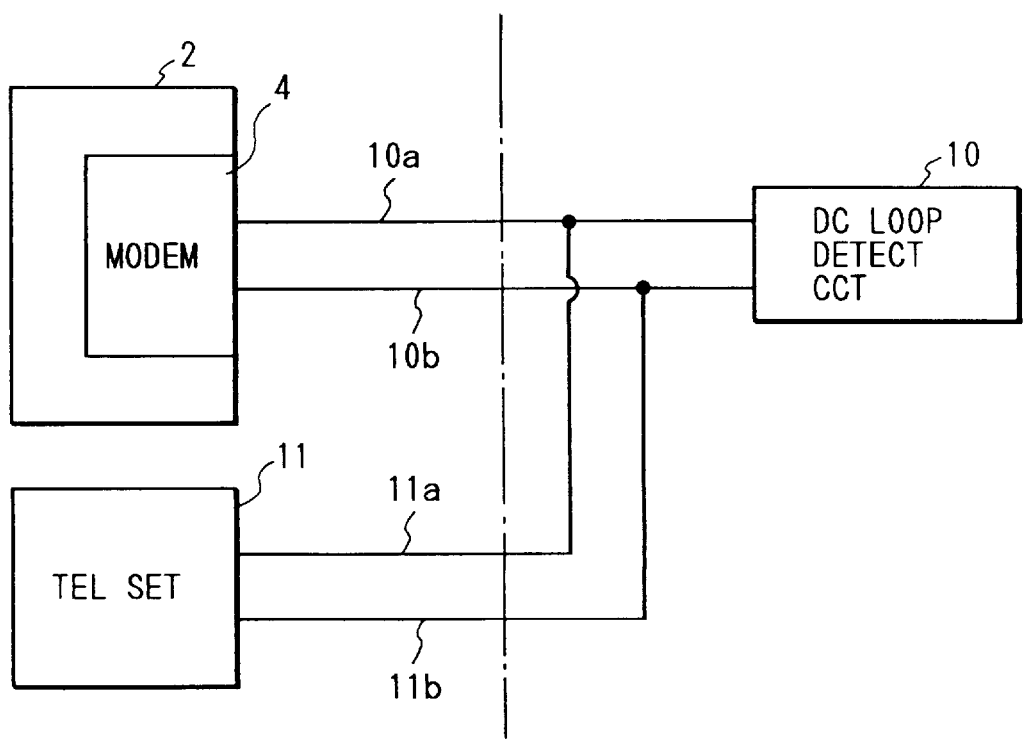
FIG. 16 shows a block diagram of an essential part of an eighth embodiment.

In an eighth embodiment of the present invention shown in FIG. 16, the signal lines 11a and 11b are outputted to the signal lines 10a and 10b in parallel connection and the telephone set is connected thereto.

In accordance with the embodiments of the present invention, the personal computer is connected to the line terminal of the facsimile apparatus and the facsimile communication is conducted by the facsimile apparatus and the data communication is conducted by application software of the personal computer by the modem built in the personal computer while using the single telephone line.

Further, since the terminal connected to the line terminal may be set and only the possible call receive mode for the set state is displayed, the user operability is enhanced.

Further, since the shift to the facsimile communication is displayed in the personal computer, the operability of the user of the personal computer is enhanced.

Further, since the protection circuit is inserted in the line switching unit of the facsimile apparatus and the personal computer is connected through the line switching unit, the break of the modem by the abnormal voltage such as thunder, which occurred when the personal computer is directly connected to the telephone line, is prevented.

Further, since the facsimile communication indication signal is not detected in the call connection when the data communication indication signal is received within the predetermined time interval, the shift to the facsimile communication due to erroneous detection of the facsimile communication indication signal after the detection of the data communication indication signal is prevented.

It should be understood that the present invention is not limited to the above embodiments but various modifications thereof may be made.

What is claimed is:

1. An image communication apparatus comprising:
   a connection unit for connecting an external terminal;
   a control line connectable to the external terminal;
   image communication means for conducting image communication;
   switching means for selectively connecting a communication line, different from said control line, to one of said connection unit and said image communication means;
   first detection means for detecting a signal relating to the image communication;
   control means for, in response to the detection by said first detection means in a case where the communication line has been connected to said connection unit, causing said switching means to switch the communication line from said connection unit to said image communication means; and
   informing means, responsive to the switching operation of the communication line, for informing the external terminal, via said control line connected to the external terminal, that the communication line is switched for image communication.

2. An image communication apparatus according to claim 1, further comprising:
   second detection means for detecting a call signal from the communication line; and
   third detection means for detecting capture of the communication line by the external terminal,
   wherein said control means controls said switching means in response to the detections by said first, second and third detection means.

3. An image communication apparatus according to claim 2, wherein said connection unit is capable of connecting a type of external terminal different from an external information processing terminal.

4. An image communication apparatus according to claim 2, wherein said control means causes said switching means to connect the communication line to said connection unit in response to the detection of the calling signal, and when the signal relating to the image communication is detected within a predetermined time interval after the detection of capture of the communication line by the external terminal, said control means causes said switching means to switch the communication line to said image communication means to start the image communication.

5. An image communication apparatus according to claim 4, wherein said control means does not cause said switching means to switch the communication line in response to the detection of the signal relating to the image communication when the signal relating to the image communication is not detected within said predetermined time interval.

6. An image communication apparatus according to claim 5, further comprising:

fourth detection means for detecting a presence or absence of a speech signal on the communication line, wherein said control means controls said switching means in response to the detections of said first, second, third and fourth detection means.

7. An image communication apparatus according to claim 6, further comprising:

setting means for setting a type of an external terminal to be connected to said connection unit, wherein said control means controls said switching means in accordance with the setting by said setting means.

8. An image communication apparatus according to claim 7, wherein the type of the external terminal includes an information processing terminal, a telephone set and an automatic answering telephone set.

9. An image communication apparatus according to claim 7, further comprising selection means for selecting one of plurality of call receive modes for an image communication mode, a telephone mode and an image communication/telephone switching mode when the external terminal is a telephone set, wherein said control means controls said switching means in accordance with the selected call receive mode.

10. An image communication apparatus according to claim 7, further comprising:

selection means for selecting one of a plurality of call receive modes for an image communication mode and an automatic answering telephone set prioritized mode when the external terminal is an automatic answering recording telephone set, wherein said control means controls said switching means in accordance with the selected call receive mode.

11. An image communication apparatus according to claim 7, further comprising:

selection means for selecting one of a plurality of call receive modes from an image communication made and an information processing terminal prioritized mode when the external terminal is the external information processing terminal, wherein said control means controls said switching means in accordance with the selected call received mode.

12. An image communication apparatus according to claim 1, wherein said switching means includes protection means for protecting the external terminal against an abnormal voltage from the communication line.

13. An image communication apparatus according to claim 12, wherein said protection means comprises an arrester.

14. An image communication apparatus according to claim 1, wherein said informing means informs the external terminal, via said control line through an interface different from said connection unit, that the communication line is switched.

15. An image communication method operative in an image communication apparatus comprising a connection unit, a control line and a separate image communication means for conducting image communication, said method comprising:

a connecting step of connecting an external terminal to the connection unit;

a switching step of selectively connecting a communication line to one of the connection unit and the image communication means;

a first detection step of detecting a signal relating to the image communication;

a control step of, in response to the detection by said first detection step in a case where the communication line has been connected to the connection unit, causing said switching step to switch the communication line from the connection unit to the image communication means; and an informing step, responsive to the switching operation of the communication line, of informing the external terminal, via the control line connected to the external terminal, that the communication line is switched for image communication.

16. An image communication method according to claim 15, further comprising:

a second detection step of detecting a call signal from the communication line; and a third detection step of detecting capture of the communication line by the external terminal, wherein said control step controls said switching step in response to the detections by said first, second and third detection steps.

17. An image communication method according to claim 16, wherein the connection unit is capable of connecting a type of external terminal different from an external information processing terminal.

18. An image communication method according to claim 16, wherein said control step causes said switching step to connect the communication line to the connection unit in response to the detection of the calling signal, and when the signal relating to the image communication is detected within a predetermined time interval after the detection of capture of the communication line by the external terminal, said control step causes said switching step to switch the communication line to the image communication means to start the image communication.

19. An image communication method according to claim 18, wherein said control step does not cause said switching step to switch the communication line in response to the detection of the signal relating to the image communication when the signal relating to the image communication is not detected within said predetermined time interval.

20. An image communication method according to claim 19, further comprising:

a fourth detection step of detecting a presence or absence of a speech signal on the communication line, wherein said control step controls said switching step in response to the detections of said first, second, third and fourth detection step.

21. An image communication method according to claim 20, further comprising:

a setting step of setting a type of an external terminal to be connected to the connection unit, wherein said control step controls said switching step in accordance with the setting by said setting step.

22. An image communication method according to claim 20, wherein the type of the external terminal includes an information processing terminal, a telephone set and an automatic answering telephone set.

23. An image communication method according to claim 20, further comprising a selection step of selecting one of plurality of call receive modes for an image communication mode, a telephone mode and an image communication/telephone switching mode when the external terminal is a telephone set, wherein said control step controls said switching step in accordance with the selected call receive mode.

24. An image communication method according to claim 20, further comprising:
- a selection step of selecting one of a plurality of call receive modes for an image communication mode and an automatic answering telephone set prioritized mode when the external terminal is an automatic answering recording telephone set,
- wherein said control step controls said switching step in accordance with the selected call receive mode.

25. An image communication method according to claim 20, further comprising:
- a selection step of selecting one of a plurality of call receive modes from an image communication made and an information processing terminal prioritized mode when the external terminal is the external information processing terminal,
- wherein said control step controls said switching step in accordance with the selected call received mode.

26. An image communication method according to claim 15, wherein said switching step includes a protection step of protecting the external terminal against an abnormal voltage from the communication line.

27. An image communication method according to claim 26, wherein said protection step uses an arrester.

28. An image communication method according to claim 15, wherein said informing step informs the external terminal, via the control line through an interface different from the connection unit, that the communication line is switched.

* * * * *

UNITED STATES PATENT AND TRADEMARK OFFICE
CERTIFICATE OF CORRECTION

PATENT NO. : 5,892,815
DATED : April 6, 1999
INVENTOR(S) : TAKEHIRO YOSHIDA, ET AL.

It is certified that error appears in the above-indentified patent and that said Letters Patent is hereby corrected as shown below:

COLUMN 12

Line 3, "occurred" should read --occurs--.

COLUMN 13

Line 39, "made" should read --mode--.

COLUMN 15

Line 13, "made" should read --mode--.

Signed and Sealed this

Twenty-third Day of November, 1999

Attest:

Q. TODD DICKINSON

Attesting Officer     Acting Commissioner of Patents and Trademarks